April 5, 1949.    H. B. DE VORE    2,466,537
CATHODE-RAY TUBE SWEEP CIRCUIT
Filed Feb. 28, 1947    2 Sheets-Sheet 1
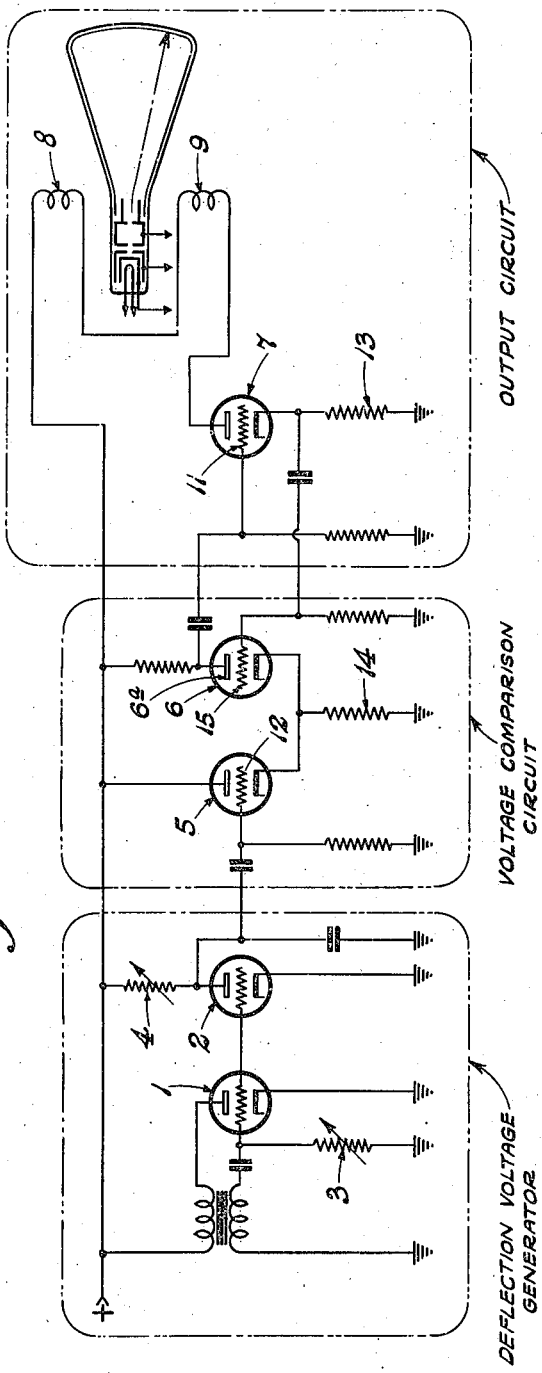
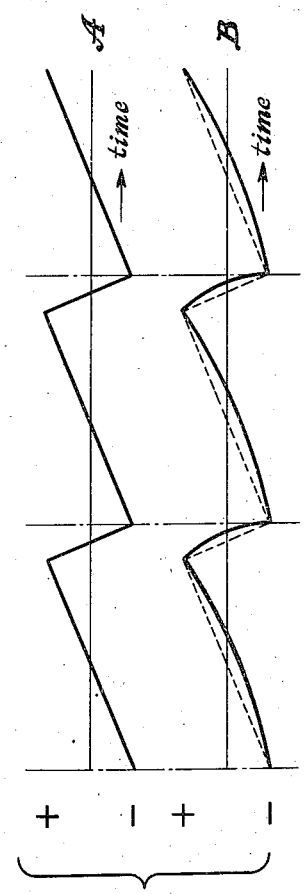
INVENTOR.
Henry B. DeVore
BY
Thomas S. Ross
ATTORNEY

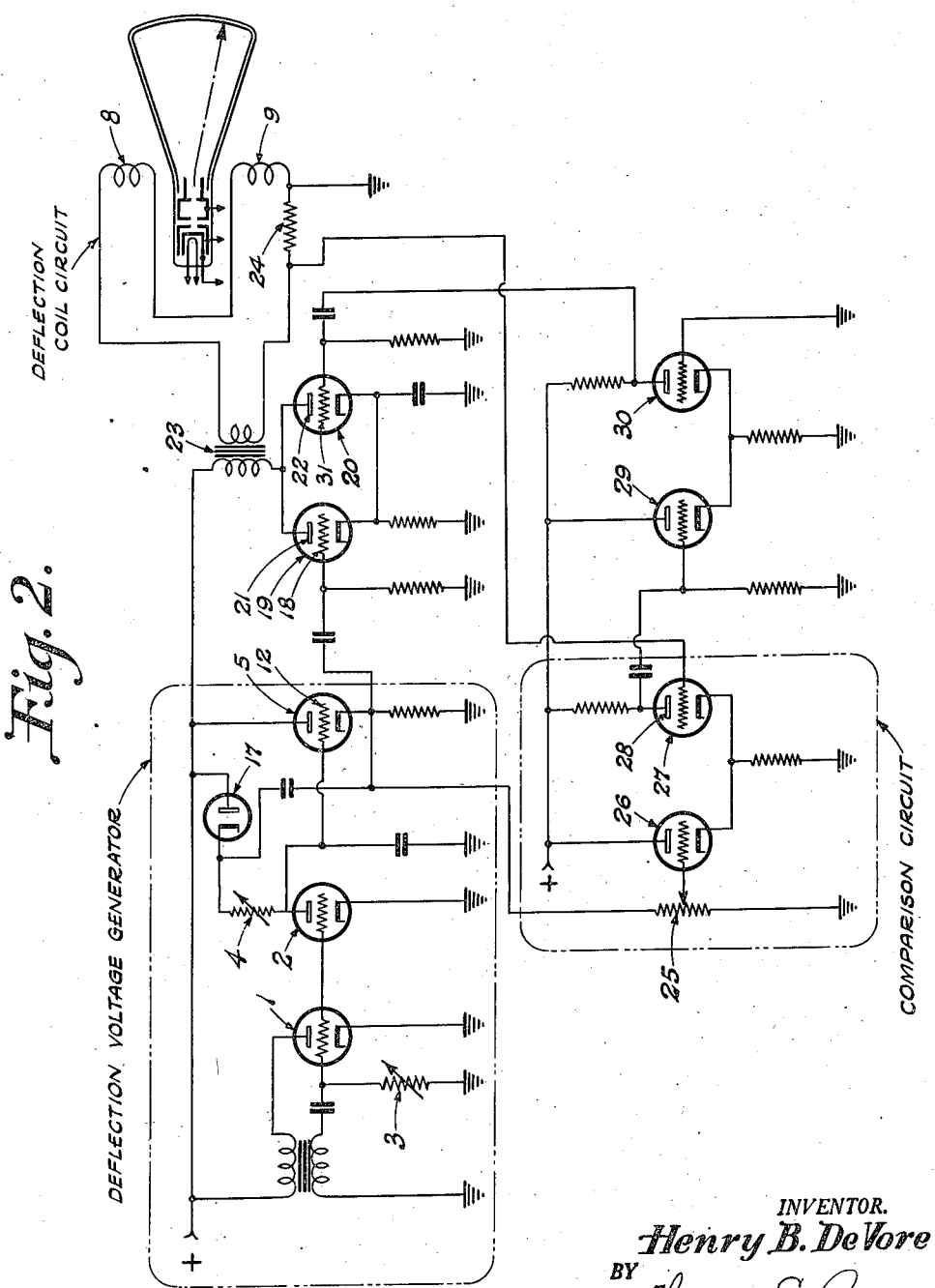

Patented Apr. 5, 1949

2,466,537

UNITED STATES PATENT OFFICE 2,466,537

CATHODE-RAY TUBE SWEEP CIRCUIT

Henry B. De Vore, Norwalk, Conn., assignor to Remington Rand Inc., New York, N. Y., a corporation of Delaware Application February 28, 1947, Serial No. 731,554

4 Claims. (Cl. 315—27)

This invention relates generally to cathode-ray deflection circuits and more particularly to means for improving the linearity of deflection of the electron beam in a cathode-ray tube of the electromagnetic deflection type.

It is frequently desirable, especially in television equipment, to produce deflection of the electron beam such that the beam moves at a uniform speed across the fluorescent screen of a cathode-ray tube, that is, such that a plot of beam position against time, has the shape of a linear sawtooth. This is accomplished if the current flowing through the deflection coils, plotted against time, also has the shape of a linear sawtooth. There are several well-known methods for generating a voltage wave which has an accurately linear sawtooth form, but the generation of a linear sawtooth current wave free of distortion in a circuit including deflection coils is difficult since it includes both resistance and inductance as well as other causes which also produce distortion in one form or another.

In past practice, it has been customary to connect the deflection coils, usually by means of a coupling transformer, to the anode circuit of a vacuum tube, drive the grid of this tube with a sawtooth voltage wave, and arrange the operating conditions of the tube such that non-linearities in the operation of the tube will approximately compensate for the non-linearities arising from the characteristics of the deflection coils and transformer.

The principal object of my invention is to reduce to a minimum the distortion caused by the magnetic circuit of the deflecting system and by the amplifier itself. I propose to accomplish this by the use of a new and novel method which employs a vacuum tube circuit to compare the deflection coil current wave with the driving sawtooth voltage wave; then derive from this comparison circuit a signal which is a function of the difference between the two waves; and to then employ this difference, or error signal, to correct the flow of current through the deflection coils in such a manner that the time variation of current resulting will very closely approximate that of the driving voltage.

The foregoing objects and others hereinafter appearing are attained in the embodiment of the invention illustrated in the accompanying drawings wherein:

Fig. 1 is a diagram showing the electromagnetic deflecting portion of a cathode-ray tube and its associated amplifier circuits in which deflection coils, so constructed as to have comparatively high impedance, are connected directly in the anode circuit of the driving vacuum tube in accordance with my invention.

Fig. 2 illustrates a modified construction of my invention which is particularly adaptable to deflection circuits in which the deflection coils, constructed so as to have comparatively low impedance, are coupled to the driving vacuum tube by a transformer designed to provide appropriate impedance matching, and, Fig. 3 is a graph of current or voltage wave forms which may exist at various points in the circuit and is used to explain the operation of my improved deflection circuit.

Referring now to Fig. 1 of the drawing, vacuum tubes 1 and 2, together with their associated circuit elements, represent a conventional sawtooth voltage generator comprising a blocking oscillating circuit and a discharge tube respectively. The repetition frequency may be controlled by a variable resistor 3 and the amplitude of the sawtooth voltage by resistor 4. Vacuum tubes 5 and 6, together with their associated circuit components, represent a preferred form of my novel comparison circuit and amplifier in a manner to be more fully explained as this description proceeds.

Reference numeral 7 designates an output vacuum tube which drives the deflection coils 8 and 9, and a resistor 13 is in the cathode circuit of said tube 7 from which resistor is derived a voltage wave proportional at all times to the current flowing through the deflection coils 8 and 9 respectively. This voltage wave is fed to the control element or grid 15 of tube 6 of the comparison circuit.

To understand the operation of this comparison circuit, assume that a positive going sawtooth is applied to the grid 12 of tube 5, as illustrated in the graph A shown in Fig. 3. Tubes 5 and 6 jointly form a cathode-ray coupled amplifier such that this positive going sawtooth applied to grid 12 of tube 5 will be reproduced in amplified form at the plate 6ª of tube 6, and this amplified sawtooth voltage is used to drive grid 11 of the output tube 7. Further assume that the inductance of the deflection coils 8 and 9 tends to retard the build-up of current in said coils which would give a current wave form as shown in the solid line of graph B of Fig. 3. Thus the voltage across resistor 13, which must have the same wave form as the current through the deflection coils, increases less rapidly than a sawtooth current would require. Because of the common cathode resistor 14, the cathodes of tubes 5 and 6 will rise in potential at substantially the same rate as the grid 12 of tube 5 and the slower rise in potential of the grid 15 of tube 6, coupled to resistor 13, will cause a reduction in current flow through tube 6, allowing its anode or plate potential to rise rapidly to apply a relatively large positive potential to the grid 11 of the driving tube 7. This forces a larger current through the deflection coils 8 and 9, thus tending to make the rate of rise of the potential across resistor 13, as shown in the dotted lines of graph B of Fig. 3, the same as that fed to the grid 12 of tube 5.

Conversely, if the rate of current increase through the deflection coils 8 and 9 tends to be more rapid than corresponds to the initial voltage sawtooth, the anode or plate potential of tube 6 will be lowered rapidly thus tending to reduce the rate of current rise. The comparison circuit formed by tubes 5 and 6 and associated circuit elements thus tends to form the current wave through the deflection coils into a replica of the initial voltage wave impressed upon grid 12 of tube 5.

When transformer coupling of the deflection coils is used the current wave through the deflection coils may differ considerably from the current wave flowing in the primary of the coupling transformer and the comparison voltage wave must be derived from the current actually flowing through the deflection coils. In Fig. 2, I have illustrated a circuit which is designed to operate in this manner. Tubes 1 and 2 and associated circuit elements act, as before, to generate a nearly linear sawtooth voltage wave. As an additional modification of the circuit illustrated in Fig. 2, there has been added the known "bootstrap" circuit, formed by tubes 5 and 17 together with their associated circuit elements, such circuit serving to improve the linearity of the sawtooth voltage wave. This voltage wave is coupled to the grid 18 of tube 19 which is one of the two parallel output tubes 19 and 20. The anodes or plates 21 and 22 of tubes 19 and 20 respectively are connected together and coupled through the transformer 23 to the deflection coils 8 and 9. A small resistor 24 in series with the deflection coils serves to develop a voltage wave corresponding to the current wave through the deflection coils.

The above referred to voltage wave, which must be developed in the same phase as the initial voltage wave, and a portion of the initial voltage wave taken from potentiometer 25 are compared in the circuit formed by tubes 26 and 27 with their associated circuit elements. This circuit, operating in substantially the same manner as the one described above in connection with Fig. 1, develops a difference or error signal at the plate 28 of tube 27. This signal is then amplified by tubes 29 and 30 in such a manner as to keep its phase unchanged and is coupled to the control element or grid 31 of the output tube 20. It will now be understood that this circuit tends to correct the current wave through the deflection coils continuously and in such a manner as to make the current wave form a replica of the initial voltage wave form impressed upon grid 18 of the tube 19.

It is to be particularly noted that the comparison and correction circuits described in accordance with my invention are not to be limited to the generation of a linear sawtooth form since they will operate to make the current wave form generated in the output circuit a replica of any form of initial voltage wave used to drive the circuit.

While I have shown and described a particular embodiment of my invention it will be apparent to those skilled in the art that numerous modifications and variations may be made in the form and construction thereof, without departing from the more fundamental principles of the invention. I therefore desire, by the following claims, to include within the scope of my invention all such similar and modified forms of the apparatus disclosed, by which substantially the results of the invention may be obtained by substantially the same or equivalent means.

Having thus described my invention what I claim as new and desire to secure by Letters Patent is:

1. In a cathode-ray tube sweep circuit including deflection coils, a sawtooth voltage generator, an electron discharge device, and a deflection coil circuit driven by said electron discharge device, in combination with a resistor in the cathode circuit of said electron discharge device capable of developing a voltage wave proportional to the current wave in the deflection coils; a voltage comparison circuit which develops an error signal by comparison of the original deflection voltage wave form with the output current wave form of said generator; and means to apply said error signal in proper phase to the control element of said electron discharge device to correct the current flowing through the deflection coils in such a manner that the time variation of the current resulting will closely approximate that of the original deflection voltage produced by said generator.

2. In a cathode-ray tube sweep circuit of the class described including electromagnetic deflection coils, a deflection voltage wave generator, an electron discharge device having an anode, cathode and control element, a deflection coil circuit coupled to said electron discharge device, in combination with a resistor in the deflection coil circuit to develop a voltage wave proportional to the current wave in said deflection coil circuit; a voltage comparison circuit; means for impressing upon said voltage comparison circuit a signal proportional to the original deflection voltage wave form and a signal proportional to the current wave form in the deflection coils; an error signal developed by said voltage comparison circuit; means for amplifying said error signal; and means for developing in the output circuit a current proportional to said error signal, said last mentioned means comprising a second electron discharge device having its anode and cathode connected to the anode and cathode respectively of said first mentioned electron discharge device, and its control element having impressed on it said amplified error signal in proper phase.

3. In a cathode-ray tube sweep circuit of the class described including electromagnetic deflection coils, a deflection voltage generator, an output vacuum tube, and a deflection coil circuit driven by said output vacuum tube, in combination with a resistor in the output vacuum tube circuit adapted to develop a voltage wave proportional to the current wave in the deflection coils; and a voltage comparison circuit adapted to develop an error signal by comparison of the original deflection voltage wave form and the output current wave form; said voltage comparison circuit comprising a pair of vacuum tubes having their cathodes joined together and coupled through a common resistance to ground, one of said tubes having impressed on its control element a signal proportional to the original deflection voltage wave form and the other of said tubes having impressed on its control element a signal proportional to the current wave form in the deflection coil circuit and in the same phase as said first mentioned signal, the anode of one tube being connected to a positive voltage supply, and the anode of the other of said tubes connected to the positive voltage supply by a resistor, across which resistor the error signal is developed; said error signal being amplified by a sufficient number of amplifier stages to obtain proper polarity, and said amplified error signal then being applied to the said output vacuum tube.

4. In a cathode ray tube sweep circuit of the class described including electromagnetic deflection coils, a deflection voltage generator, an electron discharge device and a deflection coil circuit driven by said electron discharge device, in combination with a resistor in the circuit associated with the electron discharge device adapted to develop a voltage wave proportional to the current wave in the deflection coils; and a voltage comparison circuit adapted to develop an error signal by comparison of the original deflection voltage wave form with the output current wave form; said voltage comparison circuit comprising two electron discharge devices, each having an anode, cathode, and a control element, the cathodes of the two electron discharge devices being joined together and coupled through a common impedance to ground, the first electron discharge device having impressed on its control element a signal proportional to the original deflection voltage wave form, the second electron discharge device having impressed on its control element a signal proportional to the current in the deflection coil circuit, the anode of one electron discharge device being connected to a positive voltage supply, and the anode of the second electron discharge device being connected to the positive voltage supply through an impedance across which the error signal is developed, said error signal being applied to the first mentioned electron discharge device in such a manner as to correct any deviation from the desired wave form of the deflection current.

HENRY B. DE VORE.

REFERENCES CITED

The following references are of record in the file of this patent:

UNITED STATES PATENTS

| Number | Name | Date |
| --- | --- | --- |
| 2,280,990 | White | Apr. 28, 1942 |
| 2,373,748 | Eaton | Apr. 17, 1945 |